April 14, 1953     T. F. CARMICHAEL     2,634,559
VIBRATORY ELECTRIC MOTOR AND MECHANISM DRIVEN THEREBY
Filed July 15, 1950
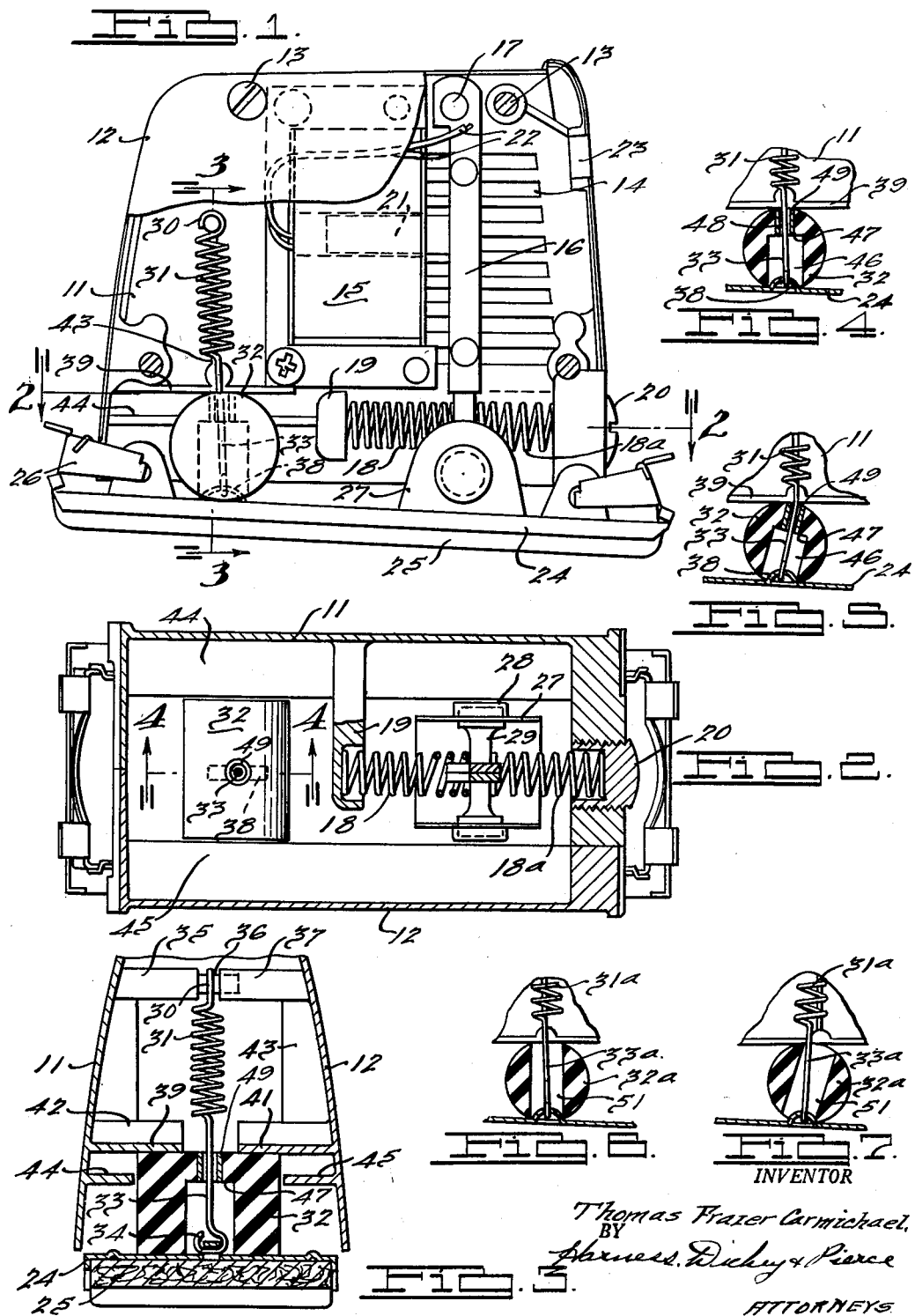

Patented Apr. 14, 1953

2,634,559

UNITED STATES PATENT OFFICE 2,634,559

VIBRATORY ELECTRIC MOTOR AND MECHANISM DRIVEN THEREBY

Thomas Frazer Carmichael, Plymouth, Mich., assignor to Syncro Corporation, Oxford, Mich., a corporation of Michigan Application July 15, 1950, Serial No. 174,101

12 Claims. (Cl. 51—170)

1

This invention relates to vibratory electric motors and mechanisms driven thereby, and particularly to motors of the swinging armature type having a tool or other reciprocatory member connected to and driven by the armature.

It is an object of this invention to provide a vibratory electric motor and tool driven thereby having a novel arrangement of elements whereby a smooth and regular reciprocating movement is imparted to the tool by the swinging armature without impairing the power output or the stroke of the device.

It is another object to provide a vibratory electric motor of the swinging armature type having a reciprocating tool driven thereby, and frictionless means for guiding the tool for movement in parallel relation with the work, such means simultaneously providing a resilient support for maintaining the operative portion of the tool against the work.

It is a further object to provide a mechanism as described above, having means for yieldably holding the tool-supporting member in position, said yieldable means also serving to prevent the frictionless guiding means from being displaced during operation of the device.

Other objects of the invention will become apparent from the following specification, the drawings relating thereto, and from the claims hereinafter set forth:

In the drawings:

Figure 1 is an elevational view of the device according to the invention as applied to a sanding tool, parts being broken away for clarity;

Figure 2 is a plan cross-sectional view of the lower portion of the device, taken along the line 2—2 of Figure 1;

Figure 3 is a cross-sectional view taken substantially along the line 3—3 of Figure 1 and showing the novel supporting and guiding means;

Figure 4 is a cross-sectional view taken along the line 4—4 of Figure 2, with the tool in its neutral position;

Figure 5 is a view similar to Figure 4 but with the tool in its extreme leftward position;

Figure 6 is a view similar to Figure 4 showing a modified form of tool guiding means; and Figure 7 is a view similar to Figure 5 of the modified construction.

The device shown in Figures 1 to 5 comprises in general a casing which preferably comprises two interfitting shell sections 11 and 12, united by bolts 13 and having vent openings 14 therein. Mounted within the casing is a vibratory electric motor comprising an electromagnet 15

2 and an armature 16 movable thereby. The construction of the motor and its associated parts is preferably similar to that described in my copending application Serial No. 109,118, filed August 8, 1949. As disclosed in greater detail in the aforesaid application, the armature 16 is freely pivoted for movement to and from the electromagnet on a pin 17 rigidly mounted to the casing, and has engageable therewith at its free end a pair of opposing springs 18 and 18a. The opposite end of spring 18 is supported by an ear 19 integral with shell section 11 and extending inwardly therefrom. Spring 18a is engageable at its outer end with an adjusting nut 20 threadably mounted in shell section 11 by means of which the compression in the springs may be adjusted. A core 21 integral with the armature extends into the coil of the electromagnet, and terminals 22 of the coil are adapted for connection to a power lead (not shown) from an alternating current source extending through opening 23 in the casing and controlled by a switch (also not shown) which may be mounted on the casing.

Pivotally connected to the free end of armature 16 is a platen 24 which, in the embodiment of Figures 1 to 5 is adapted to receive a sheet of sandpaper or the like (not shown) for use in sanding the surfaces of various materials. For this purpose the platen 24 has mounted on its lower surface a felt pad 25, and is further provided with a pair of spring-urged clips 26 pivotally mounted at either end for gripping the edges of the sheet of sandpaper, which underlies the felt pad when in its operative position. It will be understood, however, that the novel arrangement of parts which comprises this invention is equally applicable to other types of reciprocating power tools which involve the use of other planular work-engaging means. Thus, while the casing in the illustrated embodiment is substantially rectangular and open-bottomed in shape, the arrangement of this invention could be used in conjunction with casings having other shapes, and with various types of driven members adjacent the casing.

The platen 24 is pivoted to the armature by means of a pair of upstanding ears 27 attached to the platen and having circular recesses 28 which receive respectively a pair of lugs 29 extending laterally from the free end of the armature, the lugs being retained in the recesses by rubber inserts (not shown) or other retaining means. It will be seen, therefore, that upon swinging movement of the armature 16 about pivot 17, a corresponding movement will be imparted to that portion of the platen to which the armature is connected.

In order to retain the other side of platen 24 upwardly and to guide the platen with relation to the work and to the armature movement, a tension spring 31 is provided having one end secured to the casing and the opposite end secured to the platen and urging it upwardly against a cylindrical guiding roller 32. The active portion of spring 31 is preferably helical in shape, and the spring comprises an upper looped portion 30, a series of helical coils immediately therebelow, and a lower straight section 33 normally in alignment with the coils and extending downwardly to a lower loop 34. A projection 35 within shell section 11 has extending from its inner end a pin 36, the opposite end of which is supported by a projection 37 within shell section 12 as shown in Figure 3 and the upper loop 30 of spring 31 is anchored to the casing by engagement with the intermediate section of pin 36. An eye 38 is pressed upwardly from the surface of platen 24, and lower loop 34 of spring 31 is secured to the platen by engagement through eye 38.

The guide roller 32 comprises a cylindrical member having its axis of rotation substantially normal to the direction of movement of platen 24, the roller being preferably constructed of hard rubber or other resilient and vibration-dampening material. The lower portion of the roller is engageable with platen 24 and the upper portion with a pair of roller platforms 39 and 41 extending inwardly from shell sections 11 and 12 respectively. These platforms are in spaced alignment substantially parallel to platen 24, and ribs 42 and 43 may be provided integral respectively with the platforms and the shell sections to provide the necessary rigidity during the operation of the device. A pair of guides 44 and 45 integral with the shell sections are spaced below platforms 39 and 41 respectively and roller 32, positioned between these guides, will thus be prevented from unwanted lateral movement in a direction normal to the stroke of the tool. As best seen in Figure 1, the dimensions of the parts are such that when in its operative position the plane of platen 24 will be slightly inclined relative to the casing as to further facilitate the handling of the tool.

The roller 32 is provided with a central aperture 46 of relatively large diameter, an inner shoulder 47 and a constricted aperture 48 above the shoulder, the arrangement being preferably such that the constricted aperture extends a relatively short distance along the diameter of the roller. A bushing 49 may be inserted within aperture 48 to prevent undue wearing of the roller. When in its operative position the coil portion of spring 31 extends downwardly to a position slightly spaced above platforms 39 and 41, and the straight portion 33 of the spring extends between the platforms, within bushing 49 and downwardly through aperture 46 to the platen. The internal diameter of bushing 49 is such that a slight clearance is allowed for the straight portion 33 of the spring. It will also be observed, particularly by reference to Figures 4 and 5, that the raised eye 38 is positioned within the lower portion of aperture 46, for reasons to be described hereinafter.

In the operation of the device, roller 32 in its neutral position will be substantially as shown in Figure 4. In this position apertures 46 and 48 will be in alignment with spring 31, and the latter will extend therethrough without material engagement with the bushing 49. When the electromagnet 15 is actuated, the swinging vibratory movement of armature 16 will, as described previously, cause a corresponding reciprocatory movement of platen 24. As the platen is moved to the left relative to platform 39 and 41, it will cause a clockwise rolling movement of roller 32 so that the lower portion of the roller will move to the right of eye 38 as best seen in Figure 5, the movement being exaggerated for purposes of illustration. It will thus be seen that the roller will restrict platen 24 to movement in a flat plane, counteracting the tendency of pivoted armature 16 to impart a normal component to the stroke. This movement of the roller will also cause bushing 49 to engage the straight portion 33 of spring 31 to thus bend the latter into a position inclined to the upper coil portion of the spring, the latter remaining substantially vertical. It will be seen that the movement of roller 32 will thus be restricted by the action of the spring to a positive rolling movement centered about the spring. This action is important since under constant vibratory movement there would normally be a tendency for roller 33 to acquire translatory movement or wander to the left or right from its original position. Spring 31 thus performs, in addition to its function of retaining platen 24 upwardly against roller 32, the additional function of positively retaining the roller itself in its operative position. The eye 38 which is positioned within aperture 46 will also serve to retain the lower portion of the roller from unwanted sliding movement to left or right. As will be noted from Figure 5, the spring 31 will also impart a "cranking" effect to the roller 32 tending to pull the roller back to its neutral position when it is rotated in either direction. This action will also tend to increase the efficiency of the device, since it will impart an additional driving force to platen 24 at the beginning of each stroke supplementing the forces of electromagnet 15 and springs 18 and 18a.

Figs. 6 and 7 show a modification of the roller construction which is similar to the construction of Figures 1 to 5, but which eliminates the constricted aperture 48 and the accompanying bushing 49. The roller 32a of Figures 6 and 7 comprises instead a continuous aperture 51 through which the straight portion 33a of spring 31a extends. The diameter of aperture 51 is sufficiently large so that portion 33a will clear the roller, even when the latter is in its extreme positions as shown in Figure 7. The effect of this construction will be to cause entire spring to assume an inclined position in the extreme positions of the platen, and the component of force thus created in the direction of movement of the platen will tend to increase the efficiency of the device in a manner similar to that described in the modification of Figures 1 to 5.

While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

I claim:

1. In a sanding tool, a casing, a motor having a vibratory member mounted within said casing, a driven member adjacent said casing, means on said driven member for operatively holding a sheet of sandpaper or the like, means operatively connecting said driven member to said vibratory member, a roller disposed between said driven member and said casing and spaced from said connecting means, a yieldable member urging said driven member into engagement with said roller, and means integral with said yieldable member and adapted to engage said roller to limit the translatory movement thereof relative to said casing and said driven member.

2. In a sanding tool, a casing, a motor having a vibratory member mounted within said casing, a platen adjacent said casing, a grip on said platen for operatively holding a sheet of sandpaper or the like, means operatively connecting said platen to said vibratory member, a roller disposed between said platen and said casing and spaced from said connecting means, and a spring member having one end secured to said casing and the opposite end secured to said platen and urging said platen toward said casing, said roller having a radially disposed apertured portion, said spring being partially disposed within said aperture.

3. In a sanding tool, a casing, a motor having a vibratory member mounted within said casing, a platen adjacent said casing, gripping means on said platen for holding a sheet of sandpaper or the like in operative relation therewith, means operatively connecting said platen to said vibratory member, a platform within said casing and substantially parallel to said platen, a roller disposed between said platform and said platen and spaced from said connecting means, and a spring secured to said casing and extending through said roller, the opposite end of said spring being secured to said platen, whereby said platen will be yieldably urged against said roller.

4. The combination according to claim 3, said spring comprising a coiled portion on one side of said platform and a straight portion on the other side of said platform, and disposed within said roller.

5. In combination, a casing, a motor having a vibratory member mounted within said casing, a driven member adjacent said casing, means operatively connecting said driven member to said vibratory member, a roller disposed between said casing and said driven member and spaced from said connecting means, an apertured portion in said roller, said apertured portion having a section of relatively wide diameter and a section of relatively narrow diameter, and a yieldable member partially disposed within said aperture and urging said driven member into engagement with said roller, said roller being movable during the operation of said driven member between a neutral position in which said aperture is substantially concentric with said yieldable member and an extreme position in which said aperture is in inclined relation with at least a portion of said yieldable member.

6. The combination according to claim 5, said driven member being further provided with a raised portion disposed within said roller aperture, one end of said spring being secured to said raised portion.

7. In combination, a casing, a motor having a vibratory member mounted within said casing, a driven member adjacent said casing, means operatively connecting said driven member to said vibratory member, a roller disposed between said casing and said driven member and spaced from said connecting means, an apertured portion in said roller, said apertured portion having a section of relatively narrow diameter adjacent said casing, and a tension spring connecting said driven member and said casing, said spring having a coiled portion within said casing and a straight portion within said roller aperture, the roller being movable during the operation of said driven member between a neutral position in which said spring portions are substantially aligned and an extreme position in which said spring portions are relatively inclined.

8. The combination according to claim 7, further provided with a bushing within said relatively narrow section of the roller aperture, the straight portion of said spring being engageable with said bushing when the roller is in its said extreme position.

9. The combination according to claim 2, said roller aperture being of large diameter relative to the total diameter of said roller, whereby said yieldable member will normally move freely within said aperture during the movement of said roller between its neutral and extreme positions.

10. In a sanding device, a casing, a motor having a vibratory armature mounted within said casing, a platen adjacent said casing and operatively connected to said armature, means on said platen for operatively holding a sheet of sandpaper or the like, a pair of platforms in spaced alignment within said casing, a cylindrical roller disposed between said platforms and said platen, the axis of said roller being substantially normal to the direction of operative movement of said platen, yieldable means urging said platen into engagement with said roller, and a pair of guides disposed on either side of said roller between said platforms and said platen, said guides being substantially parallel to the direction of movement of said platen.

11. In a sanding tool, a casing, a motor having a swingable member mounted within said casing, a driven member in spaced adjacent relation with said casing, a grip on said driven member for operatively holding a sheet of sandpaper or the like, means pivotally connecting said driven member to said swingable member, a roller operatively disposed between said driven member and said casing and spaced from said pivotal connection, whereby movement of said swingable member will cause reciprocating movement of said driven member in a substantially flat plane, and a spring urging said driven member into engagement with said roller, said spring being partially disposed within said roller.

12. In a sanding tool, a casing, a motor having a swingable member mounted within said casing, a driven member in spaced adjacent relation with said casing, a grip on said driven member for operatively holding a sheet of sandpaper or the like, means pivotally connecting said driven member to said swingable member, and a roller operatively disposed between said driven member and said casing and spaced from said pivotal connection, whereby movement of said swingable member will cause reciprocating movement of said driven member in a substantially flat plane, said roller being substantially cylindrical in shape and constructed of resilient material.

THOMAS FRAZER CARMICHAEL.

References Cited in the file of this patent

UNITED STATES PATENTS

| Number | Name | Date |
|---|---|---|
| 1,668,966 | Kirwin et al. | May 8, 1928 |
| 2,276,510 | Newton | Mar. 17, 1942 |
| 2,324,292 | Dremel | July 13, 1943 |
| 2,517,548 | Dobson | Aug. 8, 1950 |